United States Patent [19]
Kuo

[11] Patent Number: 5,122,911
[45] Date of Patent: Jun. 16, 1992

[54] FILTER LENS DEVICE FOR OPTICAL COLOR SCANNER

[75] Inventor: Sean Kuo, Hsinchu, Taiwan

[73] Assignee: Microtek International, Inc., Taiwan

[21] Appl. No.: 567,723

[22] Filed: Aug. 15, 1990

[51] Int. Cl.⁵ .............................................. G02B 5/22
[52] U.S. Cl. .................................. 359/889; 359/891; 355/35; 250/226; 354/102
[58] Field of Search ............... 359/891, 892, 889, 885; 358/63, 58, 75, 496, 498; 250/226, 327.2; 354/102; 353/84; 355/35

[56] References Cited

U.S. PATENT DOCUMENTS

| | | | |
|---|---|---|---|
| 3,333,505 | 8/1967 | Unuma | 359/889 |
| 3,411,847 | 11/1968 | Barbieri | 359/889 |
| 4,030,833 | 6/1977 | Barbieri | 359/889 |
| 4,744,695 | 5/1988 | Slayton et al. | 359/892 |
| 4,754,297 | 6/1988 | Edwards | 359/889 |

Primary Examiner—Loha Ben
Attorney, Agent, or Firm—Irving Keschner

[57] ABSTRACT

A filter lens device for an optical color scanner comprising a lens, at least three filters and a driving member to drive the filters to line up with scanned data and optical detectors wherein an entire document is scanned completely for each color to be reproduced. A position detecting member detects the relative positions between the filters and optical detectors, a position controlling member controlling the driving member such that the filters are moved in sequence to scan the document.

4 Claims, 1 Drawing Sheet

FILTER LENS DEVICE FOR OPTICAL COLOR SCANNER

BACKGROUND OF THE INVENTION

1. Field of the Invention

The present invention relates to an optical line scanning imaging device, and, in particular, to a filter lens device for an optical scanner for reproducing color images formed on a document, the lens device scanning the entire document for each color being scanned.

2. Description of the Prior Art

U.S. Pat. No. 4,667,253 to Chen discloses an optical linear scanning system which is capable of producing black and white images and which utilizes a pinch roller drive mechanism which drives material to be imaged past a light source. Successive scan line images which may comprise document or picture information are formed into a narrow line image which is directed through a channel to an imaging lens. The image is focused by the lens onto a linear photo-sensitive detector array, which converts the image into electrical signals. These electrical signals may be fed to an appropriate conventional signal processor which placed them in proper form for transmission or for utilization on a local imaging device. The commencement of the scanning is signaled by means of a position detector which mechanically senses when the material to be scanned enters the imaging area and again when it leaves such area, such that the scanning can be properly synchronized. Although this Chen scanning system provides a significant advance over the prior art, it is limited to scanning a black-and-white document.

U.S. Pat. No. 4,809,062 to Chen discloses a system that produces color images by means of a synchronized color wheel having red, green and blue filters placed in the optical scanning path and driven rotatably in synchronization with the scanning operation.

Although the Chen color scanner operates satisfactorily, it has certain disadvantages associated with its use. For example, color scanning is accomplished by rotating the turning wheel, the optical scanning device continually and successively (sequentially) scanning red-green-blue lights in turn for each line scanned. Interrupting the document movement for the intermittent scanning will reduce the document scanning resolution. For example, the Chen optical black-and-white scanner has a resolution of up to 300 dots per inch (dpi), the resolution decreasing to 100 dpi after installing the Chen color scanner device. Moreover, it is time-consuming to require a pause for every line scanned and then move the document again only after the line has been scanned three times. In addition, with different transmittance ratios for red, blue and green filters, the data processing technique is very complicated for consecutive scanning of three colors because the photo-sensitive detector array (such as a CCD) will display disparate magnifying ratios after processing different light signals.

Further, the physical size of the scanner device resulting from using the turning wheel and its associated driver and controller limits the commercial viability of the device. In addition, since the Chen color scanner device uses rotation of the turning wheel to scan colored documents, the image-forming components of the device require stringent synchronization with the rotation of the turning wheel in order to obtain accurate scanned images. Although it is not difficult to achieve this kind of synchronous controlling technique with current technologies, the scanning time is increased, which increases system cost and complexity.

What is desired therefore is to provide a filter lens device for optical color scanners which will increase the resolution and speed of scanning while reducing the system size, cost and complexity.

SUMMARY OF THE PRESENT INVENTION

The present invention provides a filter lens device for optical color scanners which increases the resolution and speed of scanning and enables the scanner to be reduced in size. In addition, synchronizing the movement of the filter lens device need not be as accurate as that required in the Chen optical color scanner, thus reducing system cost while at the same time increasing the speed of image-forming.

The above features are provided by avoiding the requirement of scanning a single line three times before scanning the next document line by scanning the entire document once for each color reproduced, increasing the scanning speed while at least maintaining the resolution of the reproduced image.

The filter lens device for the optical color scanner of the present invention comprises at least three color filter components to filter light reflected to a light detector during scanning; means for securing the filter components to the filter lens means; means for connecting the filter lens means to a driving means; means to drive the filter lens means to enable the designated filter components to line up with the scanned data and the optical detectors; means for mounting the driving means to the frame of the optical detectors; a position detection means to detect the relative position between filter components in the filter lens means and optical detectors; and a position controlling means to control the driving means in order to move the selected filter component of the filter lens device to the scanning position in sequence.

The first selected filter component of the filter lens means is positioned to the line formed by the scanned materials and the optical detectors during scanning of colored documents. After the entire document is scanned, the second selected filter component is directed to the aforesaid scanned position to conduct a complete scanning. The sequence continues until all the selected filter components have entered the scanning position and the documents have gone through as many scannings as there are filters. A computer forms a multicolor image from the individual color scanned images.

The filter lens device of the present invention is significantly reduced in size when compared to the filter lens device used in the aforementioned Chen color scanner and thus the overall size of the optical scanner device itself is reduced in size. The speed of scanning is also increased without sacrificing resolution. Furthermore, system complexity will be minimized due to less stringent requirements of synchronizing the movement of the filter lens device during each line scanning.

BRIEF DESCRIPTION OF THE DRAWING

For a better understanding of the invention as well as other objects and further features thereof, reference is made to the following description which is to be read in conjunction with the accompanying drawing wherein.

DESCRIPTION OF THE PREFERRED EMBODIMENT

Figure 1:
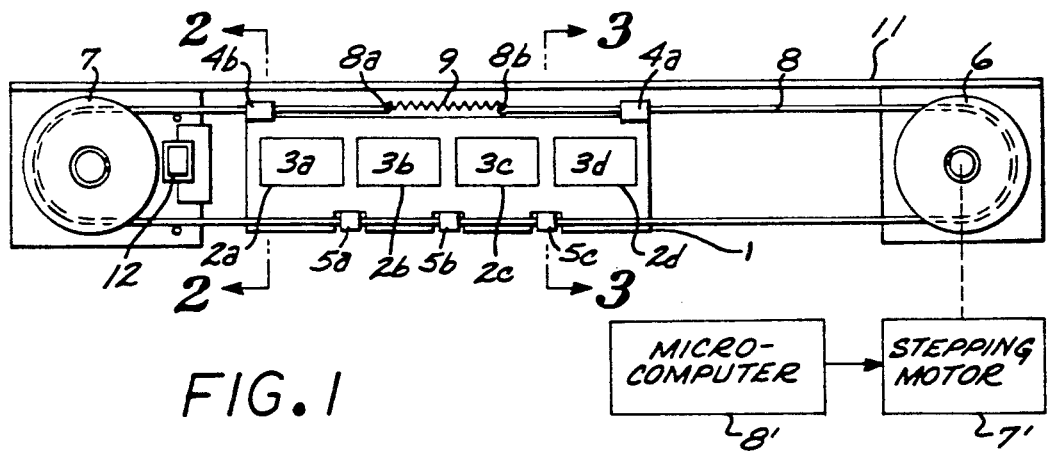
FIG. 1 illustrates the filter lens device of the present invention for use in an optical color scanner.

Referring to FIG. 1, the filter lens device comprises filter lens frame 1 and filter lens windows 2a, 2b, 2c and 2d positioned in frame 1. The numbers of filter lens windows depend on necessity, and preferably there are four for colored scanning. Filters 3a, 3b, 3c and 3d can be red, blue, green and black filters in sequence and are affixed to filter lens windows 2a, 2b, 2c and 2d, respectively. At the upper right and left corner of filter lens frame are protruding parts bending downward to form connecting parts 4a and 4b. At the lower part of the filter lens frame, several locations (three for example) are selected to form guide rails 5a, 5b, and 5c. Two pulleys 6 and 7 are arranged at a distance not too far away from the right and left side of the frame. The driving belt 8 attaches to the filter lens frame 1 at the connecting part extending to and winding around pulley 6 and then going through the guide rails 5c, 5b, and 5a to the bottom of pulley 7, winding upward to the connecting part 4b and again attaching to the filter lens frame 1.

Figure 2:
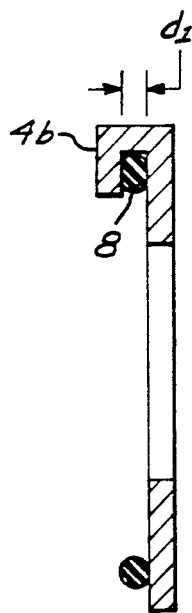
FIG. 2 is a sectional view along line A—A of FIG. 1.

FIG. 2 shows a sectional view of the connecting parts 4a and 4b formed by bending the extruding portion of the filter lens frame 1. The distance d1 between the connecting parts 4a and 4b and the filter lens frame 1 can be smaller than the diameter of the driving belt 8, thus enabling friction to drive the movement of the filter lens frame 1.

An extension spring 9 may be used to connect both sides of the driving belt 8 in order to balance the tension of the driving belt, by forming a closed loop. Alternatively, the whole driving belt 8 (distance $d_2$ is the cross-sectional width of driving belt 8) may comprise on elastic belt, such as rubber belt, which will also balance the tension.

Figure 3:
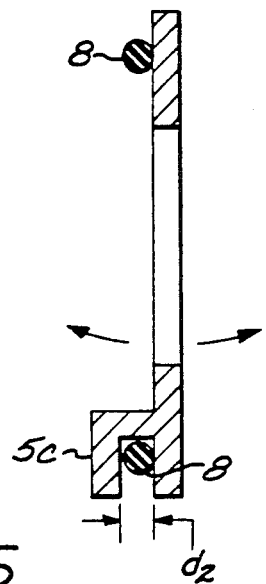
FIG. 3 is a sectional view along line B—B of FIG. 1.

FIG. 3 is a sectional view showing guide rail 5c at a suitable location in the filter lens frame 1. The distance between guide rails 5a, 5b, 5c and the filter lens frame 1 can be slightly larger than the diameter of the driving belt 8 (distance $d_2$ is the cross-sectional width of driving belt 8) in order to maintain the verticality between the filter lens frame and the optical axis of the lens windows and avoid the x-y swing of the frame (shown as arrows) during frame movement or data scanning. Therefore the driving belt 8 can move freely within the space and keep the filter lens frame 1 to stay at the driving belt, obstructing its axial movement along the x or y direction as shown.

Figure 4:
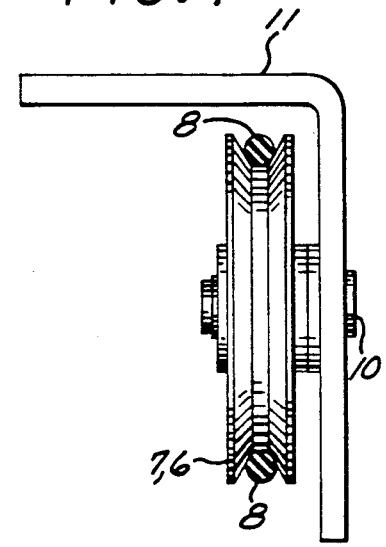
FIG. 4 shows an arrangement of pulleys to control the movement of the scanner driver.

FIG. 4 shows the axes of pulleys 7 coupled to axle 10 and supported by frame 11. Frame 11 is supported to the outside frame (not shown) of the scanner by conventional means (note that the filter lens frame 1, driving belt 8 and pulleys 7 are installed in frame 11).

At least one of the pulleys 6 and 7 can be connected to the driving shaft of a stepping motor 7' (although pulley 6 is shown coupled to motor 7', pulley 7 can be connected to motor 7' or to a separate stepping motor) by any suitable. means to transmit the driving force of the stepping motor 7' to that pulley which in turn will cause the lateral movement of the frame 1 through the driving belt 8.

A position detector 12 (mechanical, optical or any other appropriate means) is positioned at one side of pulley 7 which, after detecting the position of the frame 1, emits signals to a controller, such as a microcomputer 8' in order to control the movement of the filter lens frame 1. An IBM PC, Macintosh, Sun Workstation or other similar computer system can be used as the controller. The programming required for the selected controller can be accomplished by a programmer of ordinary skill in the art having the specifications of the present invention available.

Figure 5:
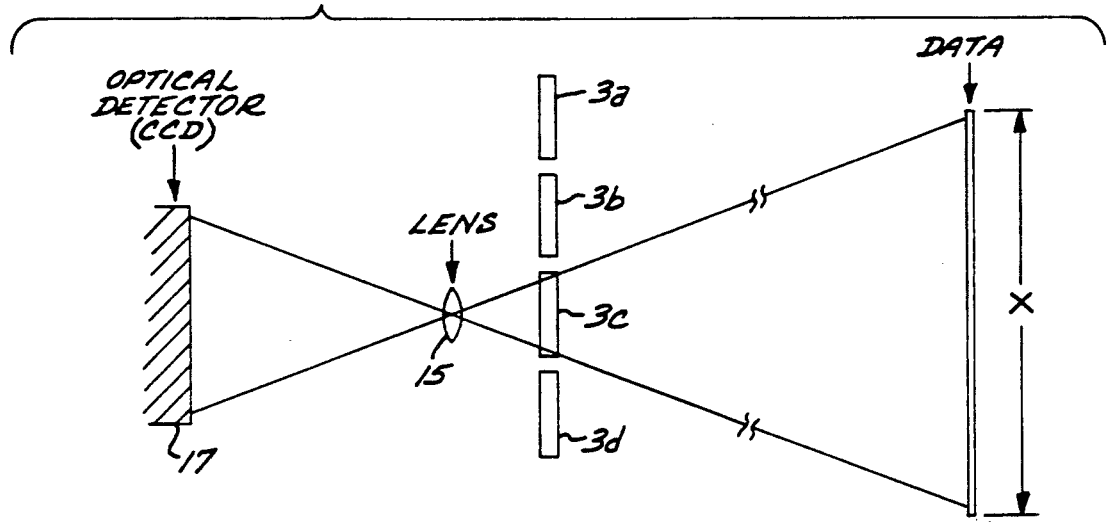
FIG. 5 is a simplified optical schematic illustrating the principles of the present invention.

The device of the present invention contains three (or four) filters. In order to obtain scanned data through one particular filter, a stepping motor (as described hereinafter) is used to steer the designated filter to a position in front of lens 15 (see FIG. 5) and optical detector 17, the filter encompassing the entire data line x being scanned. Optical detector 17, a charge coupled device of conventional design, converts the energy of light reflected from the scanned document into electrical signals (charges) which are temporarily stored, the signals then being transferred and converted by an analog shift register into corresponding voltage signals.

The designated filter component is required to stay in the scanning position for a time period in order to scan and read data. The stepping motor will be commanded by a microcomputer to move another filter into position only after the time period noted.

The scanner of the present invention uses a light detector to detect the position of the filter and, preferably, a CCD linear array detector as optical detector 17.

The operation of the filter lens device of the present invention is as follows.

When scanning begins, the controller emits signals to the stepping motor to direct the filter lens frame 1 to move towards the left of FIG. 1. When filter lens frame 1 moves to the sensing position of the position detector 12, the position detector 12 will emit an "arrival" signal to the microcomputer. The microcomputer will determine where the filter lens frame 1 should go according to whether black-and-white or color scanning will take place. For example, during black-and-white scanning, the stepping motor will be instructed to move the filter lens frame 1 such that the black-and-white filter 3d is at the scanned position in the manner illustrated in FIG. 5. For colored scanning, the microcomputer will cause the stepping motor to move filter lens frame 1 such that the filter 3a is positioned to conduct red scanning first. When the microcomputer issues the "scanning finished" signal, the stepping motor will be instructed to move the filter lens frame 1 such that the blue filter 3b is positioned for blue scanning. After that, the green filter will be caused to enter the scanned position for green scanning.

As noted above, the present invention provides a filter lens device for color scanning which increases the speed of scanning, execution and resolution while reducing the device size. In addition, the image forming process for multiple scanning wherein the scanner scans a red color for one full page, then a green color for the same full page and finally a blue color for the same full page (note that a full page scan for black-and-white scanning is provided when the filter lens is positioned directly above window 2d) is less error prone than line-to-line scanning and thus is less synchronization sensitive.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A filter lens device for an optical color scanner comprising:

a filter lens means having at least one lens and three filters for filtering light reflected from a scanned document to optical detector means during scanning;

driving means coupled to said filter lens means for enabling a selected filter to enter a scanning position formed between scanned data and said optical detector means, said optical detector means converting light incident thereon into a corresponding voltage;

position detecting means for detecting the relative positions between said filters and said optical detector means; and means for controlling said driving means whereby a first selected filter of the filter lens means is moved to the scanning position whereby during color scanning the first selected filter is moved to the scanning position for a complete scanning of the scanned document, then a second selected filter is directed to said scanning position for a complete scanning of said document and so on until all the selected filters have been in the scanning position in a sequential manner such that the document has been scanned as many times as the number of selected filters.

2. The device of claim 1, wherein the filters are arranged linearly in sequence, the filters being affixed to said filter lens means.

3. The device of claim 1, wherein the driving means comprises a stepping motor responding to said controlling means to position the filter lens means and a driving belt coupled to said stepping motor to transmit power from said stepping motor to said filter lens means.

4. The device of claim 3, wherein said driving belt comprises an elastic material.

* * * * *